United States Patent [19]

Lanter et al.

[11] Patent Number: 5,738,866

[45] Date of Patent: *Apr. 14, 1998

[54] METHOD FOR ACHIEVING THE SAME LEVEL OF MILK AND MILK COMPONENT YIELD IN RUMINANTS FED A LOW CRUDE PROTEIN DIET

[75] Inventors: Kent J. Lanter, Waterloo, Ill.; David C. Weakley, Eureka, Mo.

[73] Assignee: Purina Mills, Inc., St. Louis, Mo.

[*] Notice: The term of this patent shall not extend beyond the expiration date of Pat. No. 5,540,932.

[21] Appl. No.: 681,895

[22] Filed: Jul. 29, 1996

Related U.S. Application Data

[63] Continuation-in-part of Ser. No. 421,234, Apr. 13, 1995, Pat. No. 5,540,932.

[51] Int. Cl.[6] ................................................. A23K 1/18
[52] U.S. Cl. ................................................. 424/442
[58] Field of Search ...................................... 424/442

[56] References Cited

U.S. PATENT DOCUMENTS

| | | | |
|---|---|---|---|
| 3,496,858 | 2/1970 | Jenkins | 99/17 |
| 3,507,662 | 4/1970 | Andree et al. | 99/2 |
| 3,619,200 | 11/1971 | Ferguson et al. | 99/2 |
| 3,695,891 | 10/1972 | Fox | 99/98 |
| 4,248,899 | 2/1981 | Lyon | 426/98 |
| 4,333,923 | 6/1982 | Beck et al. | 424/115 |
| 4,377,596 | 3/1983 | Larsen | 426/2 |
| 4,540,594 | 9/1985 | Schanze | 426/74 |
| 4,558,573 | 12/1985 | LaMonica | 62/473 |
| 4,681,029 | 7/1987 | Bartesch et al. | 99/483 |
| 4,935,250 | 6/1990 | Cox | 426/94 |
| 4,957,748 | 9/1990 | Winowiski | 426/2 |
| 5,023,091 | 6/1991 | Winowiski | 426/2 |
| 5,064,665 | 11/1991 | Klopfenstein et al. | 426/2 |
| 5,120,565 | 6/1992 | Lanter et al. | 426/623 |
| 5,145,695 | 9/1992 | Smith et al. | 426/2 |
| 5,158,791 | 10/1992 | Nocek et al. | 426/231 |
| 5,182,126 | 1/1993 | Vinci et al. | 426/74 |
| 5,219,596 | 6/1993 | Smith et al. | 426/2 |
| 5,227,166 | 7/1993 | Ueda et al. | 424/438 |
| 5,540,932 | 7/1996 | Lanter et al. | 424/442 |

OTHER PUBLICATIONS

Cunningham et al., "Influence of Source and Amount of Dietary Protein on Milk Yield by Cows in Early Lactation", (1996) *J. Dairy Sci.* 79:620–630.

Schwab, Charles G., "Protected Proteins and Amino Acids for Ruminants", *Biotechnology in Animal Feeds and Animal Feeding*, pp. 115–141 (1995).

Ferguson, K.A., "The Protection of Dietary Proteins and Amino Acids Against Microbial Fermentation in the Rumen", *Digestion and Metabolism in the Ruminant*, (1975) 448–464.

Driedger, et al., "Influence of Tannins on the Nutritive Value of Soybean Meal for Ruminants", *J. Animal Sci.* 34:465 (1972).

*Primary Examiner*—Carlos Azpuru
*Attorney, Agent, or Firm*—Whyte Hirschboeck Dudek

[57] ABSTRACT

A method is disclosed providing a more efficient and economical method of feeding ruminants a lower crude protein diet while still achieving the same level of milk and milk component yield as ruminants fed a normal crude protein diet. Specifically, the method involves feeding ruminants an animal feed supplement comprising at least one rumen protected protein in combination with a lower crude protein diet. This method provides a unique approach to feed formulation in that it allows for up to a 50% reduction in crude protein intake while maintaining the intestinal protein supply and milk component yield. This in turn results in a reduction of animal urinary nitrogen losses as well as a reduction in feed costs.

16 Claims, No Drawings

METHOD FOR ACHIEVING THE SAME LEVEL OF MILK AND MILK COMPONENT YIELD IN RUMINANTS FED A LOW CRUDE PROTEIN DIET

This application is a continuation-in-part application of Ser. No. 08/421,234 filed on Apr. 13, 1995 issued as U.S. Pat. No. 5,540,932.

BACKGROUND OF THE INVENTION

1. Field of the Invention

This invention relates to animal feed supplements for ruminants and a method of achieving the same level of milk and milk component yield in ruminants which are fed a lower crude protein diet than those which are fed a normal crude protein diet.

2. Description of the Prior Art

In ruminant animals, such as cattle and sheep, microorganisms in the rumen are responsible for degrading most biologically active substances, such as proteins and amino acids. This microbial intervention inhibits the provision of supplemental nutrients to the ruminant because many desirable nutrients are metabolized before they reach a site where they can be absorbed and utilized by the host animal. Accordingly, it is important to pass these biologically active substances through the rumen without decomposition by microorganisms to allow their effective digestion and absorption in the abomasum and subsequent digestive tract.

Many techniques, formulations and the like have been tried in the past to protect the biologically active substances from further degradation in the rumen. While effective to one degree or another, these methods and formulations generally have required extensive processing and/or expensive reagents. As such, finding simplified and/or more economical methods for supplying sufficient quantities of essential amino acids for absorption in the small intestines while maintaining milk production levels remains of interest to the ruminant feed industry.

SUMMARY OF THE INVENTION

According to this invention, a method is disclosed wherein ruminants can achieve the same level of milk and milk component yield as ruminants fed a normal crude protein diet by feeding them animal feed supplements comprising rumen protected proteins in combination with a lower crude protein diet. In one embodiment of the invention, the method involves feeding an animal feed supplement comprising soybean products that have been rumen protected in any manner in combination with a lower crude protein diet. In another embodiment of the invention, the method involves feeding an animal feed supplement comprising at least about 90 wt % of at least one protein-containing source and between about 1.0 to 6.0 wt % of added fat and which has been protected using extrusion under high pressure, in combination with a lower crude protein diet. In still another embodiment of the invention, the method involves feeding an animal feed supplement comprising at least about 90 wt % of at least one protein-containing ingredient, between about 1.0 to 6.0 wt % of added fat and between about 0.02 and 5.0 wt % of sulfur and which has been protected using extrusion under high pressure, in combination with a lower crude protein diet.

This invention provides a unique approach to feed formulation in that it allows for a reduction in crude protein intake of at least about 5% to a maximum of 50% while maintaining the intestinal protein supply and milk component yield. This in turn results in a reduction of animal urinary nitrogen losses by as much as 29% as well as a reduction in feed costs. Thus, this invention provides a more efficient and economical method of feeding ruminants a lower crude protein diet while still achieving the same level of milk and milk component yield as ruminants fed a normal crude protein diet.

DETAILED DESCRIPTION OF THE INVENTION

The method disclosed in this invention involves feeding animal feed supplements comprising rumen protected proteins to ruminants in combination with a lower crude protein diet so that these ruminants can achieve the same level of milk and milk component yield as ruminants that are fed a normal crude protein diet. As used herein, the term "rumen protected proteins" refers to dietary proteins that are minimally digested in the rumen and are delivered to the small intestine from the rumen in an undegraded form. As used herein, the term "lower crude protein diet" refers to a diet for ruminants comprising a level of crude protein that is reduced from about 5% to about 50% from the prevailing published National Research Council (NRC) requirements for crude protein.

The animal feed supplements of this invention comprise rumen protected proteins. Typically, at least about 90 wt %, preferably at least about 93 wt %, and still more preferably at least about 96 wt % of the animal feed supplement is comprised of at least one rumen protected protein-containing ingredient(s). Furthermore, the overall diet for the dairy cattle (which is typically comprised of the animal feed supplement, forage components and a pre-mixed ration) is comprised of between about 1–40 wt % of rumen protected proteins. Protein sources include oil seed meals such as soybean meal and cottonseed meal; animal by-product meals such as meat meal, poultry meal, blood meal, feather meal and fish meal; plant by-product meals such as wheat middlings, soybean hulls and corn by-products; and microbial protein such as torula yeast and brewer's yeast. Soybean meal is the preferred protein source.

Preferably, the animal feed supplement of this invention also is comprised of added fat. The "added fat" of this invention includes liquid and soluble materials comprising edible mono-, di- and triglycerides of fatty acids and free fatty acids which are not inherently present in any other nonfat sources that may be present, e.g. the indigenous fat present in soybean meal, etc. Added fat includes both animal fat, e.g. beef tallow, bleachable fancy tallow, choice white grease, yellow grease, etc.; vegetable oil, e.g. soybean oil, palm oil, cottonseed oil, sunflower oil, etc.; and combinations of any of these. The amount of added fat in the animal feed supplement is typically at least about 1.0 wt %, preferably at least about 3.0 wt %. The maximum amount of added fat in the animal feed supplement is typically not greater than about 6.0 wt %.

Still more preferably, the animal feed supplement of this invention also is comprised of an amount of sulfur which does not adversely effect the economic or nutritional aspects of the dietary supplement. Typically, the animal feed supplement contains at least about 0.02% wt % sulfur, preferably at least about 0.2 wt % sulfur. The maximum amount of sulfur is typically not greater than about 5.0 wt %. Any source of elemental sulfur can be used, however, sulfur flour and flowers of sulfur are the preferred sources. Without being bound by theory, it is believed that the sulfur acts as a crosslinking agent between certain amino acids in the protein and this in turn may be responsible for the enhancement of the rumen escape of the protein and their constituent amino acids in the animal feed supplement of this invention.

Ingredients other than the protein-containing ingredient(s), added fat and sulfur also may be present in the animal feed supplement. These include flavorings such as molasses, coloring and dye ingredients, vitamins and minerals, and various processing aids, such as calcium chloride. These other ingredients are present, if present at all, in minor amounts relative to the combined amount of protein, added fat and sulfur. They are used in known ways for conventional purposes.

The animal feed supplement of this invention has a pH of at least about 3.0, preferably a pH of at least about 5.5, still more preferably a pH of at least about 6.5. The maximum pH of the animal feed supplement is typically not greater than 8.0.

Typically, the protein sources and any other components of the animal feed supplement are together subjected to rumen protection. The components of the animal feed supplement of the present invention can be protected from ruminal degradation using a variety of means, such as, for example, chemical treatment and heat treatment, or a combination of heat treatment with other treatments. Chemical treatment of feed with tannin is disclosed in U.S. Pat. No. 3,507,662, which is herein incorporated in its entirety by reference, and discloses a process for protecting proteinaceous animal feed from rumen degradation by treatment of the feed with water and tanning agents, forming a paste, and drying at a temperature not to exceed 80 C. Tannin can also be added to feed prior to pelleting, eliminating the paste forming step, and still effectively protecting the protein from rumen degradation. (Driedger (1972) J. Animal Sci. 34:465).

Chemical treatment of feed with formaldehyde is disclosed in, for example, U.S. Pat. No. 3,619,200, which is incorporated herein its entirety by reference, and discloses a process for protecting proteinaceous material from rumen degradation by chemical modification of the protein through treatment with formaldehyde. Specifically, formaldehyde reacts with amino groups at neutral pH to form methylol groups which further condenses to form methylene bridges. In the acid pH of the abomasum, this reaction reverses, rendering the protein available and liberating formaldehyde (Ferguson, 1975).

Heat treatment of feed includes expeller processing of oilseeds and soy beans, roasting, extrusion, and micronization (infrared cooking). For example, U.S. Pat. No. 3,695,891, which is herein incorporated in its entirety by reference, and discloses a process for protecting proteinaceous material from rumen degradation by reducing protein solubility and by blocking sites of enzyme attack through chemical modification.

The addition of reducing sugars (extracted from sulfite pulping liquors) to feed such as soybean meal prior to heating is disclosed in U.S. Pat. Nos. 4,377,576, 5,023,091 and 5,064,665, which are incorporated herein their entirety by reference, and also disclose processes for protecting proteinaceous material from rumen degradation.

The animal feed supplements can also be protected using conventional extrusion devices, such as that described in U.S. Pat. Nos. 3,496,858 and 5,540,932, which are here incorporated in their entirety by reference.

The animal feed supplement is typically fed to dairy cattle in combination with forage components and a pre-mixed ration that itself is in a meal, nugget or pellet form and consists of such ingredients as starch, plant and animal protein sources, vitamin and mineral additives, nitrogen sources, fiber sources and the like. The protein sources included in the total diet, however, are present at a level of protein that is reduced by at least 5% from the prevailing published National Research Council (NRC) requirements for crude protein, preferably reduced by at least about 10%, still more preferably reduced by at least about 20%, and most preferably reduced by about 30%. The maximum level of crude protein reduction in the diet is about 50% from the prevailing published NRC requirements.

This feed supplement is fed to the dairy cattle along with fibrous foodstuffs, such as alfalfa and corn silage, and of course, water. The overall mix of ingredients in the animal's diet are selected so that ruminants receiving the lower crude protein diet in combination with the high energy feed supplement can achieve the same level of milk and milk component yield as ruminants fed a normal crude protein diet.

The following examples are illustrative of certain specific embodiments of this invention. Unless indicated to the contrary, all parts and percentages are by weight.

SPECIFIC EMBODIMENTS

EXAMPLE 1

Influence of Fat and Sulfur Levels on Site of Extruded SBM Digestion for Animal Nugget Samples Prepared Using a Wenger X-20 Extruder Briefly, all but one of the samples of animal feed nuggets of this invention, were prepared using a Wenger X-20 cooking extruder. The Wenger X-20 is a laboratory scale extruder with a 30 horsepower motor, and it has the capacity to produce up to 400 lbs/min of animal feed. The animal feed nugget samples were then evaluated in sacco and in vitro using a fistulated Holstein cow in order to determine the digestibility of the samples.

Sample Preparation

Eight 150 pound animal feed samples (C1 and A–G) were prepared consistent with the proportions appearing in Table 1:

TABLE 1

| Composition of Animal Feed Samples | | | | | | | | |
|---|---|---|---|---|---|---|---|---|
| Sample/Component | C1 | A | B | C | D | E | F | G |
| SBM (%) | 100 | 100 | 99.5 | 99.0 | 97.0 | 94.0 | 96.5 | 96.0 |
| Fat (%) | 0 | 0 | 0 | 0 | 3 | 6 | 3 | 3 |
| Sulfur (%) | 0 | 0 | 0.5 | 1.0 | 0 | 0 | 0.5 | 1.0 |

Sample C1 was a control comprising untreated (i.e. unextruded) soybean meal (SBM). Samples A–C were comprised of extruded SBM and sulfur. Samples D–E were comprised of extruded SBM and fat. Samples F and G were comprised of extruded SBM, fat and sulfur.

Extruded animal feed nugget samples (A–G) were prepared using a Wenger X-20 Extruder. Specifically, the protein-containing ingredient (purchased SBM which was ground through a No. 4 Hammermill screen), sulfur (sulfur flour) and added fat (beef tallow) were placed in the proportions as set forth in Table 1 in a Hobart mixer and blended until a homogenous mixture was obtained. Each mixture was then fed to the 30 horsepower Wenger X-20 cooking extruder equipped with a 0.187 inch die (1 hole). The extruder was run according to the conditions as set forth in Table 2:

TABLE 2

Extrusion Conditions Using a Wenger X-20 Cooking Extruder

| Sample/Conditions | A | B | C | D | E | F | G |
|---|---|---|---|---|---|---|---|
| Water, conditioned lb/m | .26 | .24 | .24 | .25 | .25 | .25 | .25 |
| Water, barrel lb/m | .96 | 1.0 | .99 | .97 | .97 | .99 | .98 |
| Conditioned meal temp. F. | 199 | 198 | 198 | 201 | 195 | 202 | 203 |
| Motor amps | 28 | 26 | 26 | 24 | 20 | 24 | 24 |
| Production rate dry meal lbs/min | 5 | 5 | 5 | 5 | 5 | 5 | 5 |

Each mixture was mechanically worked within the extruder at a temperature in excess of 100 C., with the pressures varying generally above 20 psig. Each homogenous mixture then was continuously passed through the extruder and finally through the extruder die. Each mixture was extruded through the die in a continuous stream, and was a coherent structure which expanded with passage through the die to form a striated structure. The product was sliced into nuggets as it exited the die. The nuggets of each sample were then transferred by conveyor belt to a forced air dryer and dried at a temperature of about 220–230 F.

The nuggets of each sample entered the dryer with a water content of about 30 wt % and after approximately 15 minutes in the dryer at the above-stated conditions, left the dryer with a water content of about 9 wt %. The finished nuggets of each sample exhibited a hard surface with good particle integrity.

One ruminally fistulated Holstein cow was housed and fed forage as a mixture of corn silage (25%), alfalfa hay (25%) and milking ration (50%) on a dry matter basis offered ad lib for at least a two week period prior to use.

The extruded animal feed nugget samples (A–G) to be evaluated in sacco and in vitro were ground in a Wiley Mill through a 4 mm screen. The untreated sample of SBM (C1) remained unground.

Each sample (including the unground, untreated sample of SBM) was divided into six bags (Tetko P-CAP™ polyester bags; approximate pore size of 52 µm). Two of the six bags were used as 0 hr. controls (i.e. these bags were not exposed to the rumen of the fistulated cow). The other four bags were inserted into the rumen of the fistulated cow for 24 hours (in sacco).

After a 24 hour exposure in the rumen of the fistulated cow, the four bags were removed and rinsed in cold water in order to stop the microbial action. Two of the 24 hr. in sacco bags were refrigerated for later washing. The remaining two 24 hr. in sacco bags were further incubated in 0.1N HCl solution containing an amount of pepsin equivalent to the sample weight in enough fluid volume to cover the sample adequately (in vitro). The bags were agitated in a 39 C. environment for 1 hour and then immediately removed and washed along with the 0 hr. control bags and the 24 hr. in sacco bags, in cold water in a washing machine under constant agitation.

All of the sample bags (i.e. the 0 hr. control bags, the 24 hr. in sacco bags and the in vitro bags) were then dried in a 55 C. oven for 2 days. The bags were weighed and dry matter disappearance (DM) calculated. The dry matter or nitrogen escape was calculated using the following formula:

(1−(in sacco value/in vitro value))×100

The results from the 24 hr. in sacco experiments provide an estimate of ruminal digestion of the SBM samples. The results from the in vitro experiments provide an estimate of the total digestion of the SBM samples. While true absolute measures of digestion in vivo may differ from the in sacco and in vitro results, relative comparisons of these estimates among treatments allow for optimizing animal feed nugget composition parameters.

The results of the in sacco and in vitro tests are reported in percentage dry matter disappearance, and appear in Table 3:

TABLE 3

Dry Matter Disappearance (%)

| Sample/Treatment | C1 | A | B | C | D | E | F | G |
|---|---|---|---|---|---|---|---|---|
| 0 hr | 29.9 | 35.5 | 27.5 | 27.5 | 34.7 | 37.2 | 33.8 | 33.7 |
| In sacco 24 hr | 98.5 | 84.5 | 72.0 | 75.8 | 72.7 | 88.3 | 70.2 | 68.9 |
| In vitro (acid/pepsin) 1 hr | 99.2 | 96.8 | 92.7 | 95.5 | 96.9 | 97.8 | 95.1 | 93.0 |
| Escape (%) | 0.7 | 12.7 | 22.3 | 20.6 | 25.0 | 9.7 | 26.2 | 25.9 |

These results indicate that ruminal dry matter escape was maximized when SBM was extruded in the presence of 3.0% fat and 0.5 to 1.0% sulfur (samples F and G). Under these extrusion conditions (i.e. using a Wenger X-20), the ruminal escape tended to be more influenced by fat than sulfur levels. These results further indicate that inclusion of the rumen protected protein source (i.e. the extruded samples A–G) into a reduced crude protein diet would maintain absorbable protein flow into the small intestine, preventing a loss in milk and milk protein yield by the dairy cow.

The animal feed residues of these samples were further evaluated using Nitrogen analysis to determine the percentage of protein disappearance. Nitrogen analysis involves the reduction of nitrogenous compounds in a sample. Specifically, the nitrogenous compounds are reduced, in the presence of boiling sulfuric acid, catalyzed by a potassium sulfate/titanium dioxide/cupric sulfate mixture, to form ammonium sulfate. The resultant solution is cooled, diluted, and made alkaline with a sodium hydroxide-thiosulfate solution. Ammonia is liberated and distilled into a known amount of standard acid. The distillate is titrated, and nitrogen or protein is calculated from the known amount of reacting acid.

The protein disappearance (i.e. escape) is calculated using the same formula as the dry matter disappearance; namely, the in sacco value is divided by the in vitro value, subtracted from 1 and multiplied by 100.

The results of this test are reported in percentage of protein disappearance and appear in Table 4:

TABLE 4

Protein Disappearance (%)

| Samples/Treatment | C1 | A | B | C | D | E | F | G |
|---|---|---|---|---|---|---|---|---|
| 0 hr | 18.8 | 19.1 | 12.5 | 12.2 | 13.1 | 17.7 | 16.7 | 15.4 |
| In sacco 24 hr | 97.8 | 74.4 | 57.7 | 64.1 | 57.3 | 79.0 | 52.0 | 50.2 |
| In vitro (acid/pepsin) 1 hr | 98.7 | 95.5 | 90.5 | 95.4 | 95.4 | 96.6 | 90.7 | 88.6 |
| Escape (%) | 0.9 | 22.1 | 36.2 | 32.8 | 39.9 | 18.2 | 42.7 | 43.3 |

These results indicate that the ruminal protein escape was maximized when SBM was extruded in the presence of 3.0% fat and 0.5 to 1.0% sulfur (samples F and G). These results further indicated that inclusion of the rumen protected protein source (i.e. the extruded samples A–G) into a reduced crude protein diet would maintain absorbable protein flow into the small intestine, preventing a loss in milk and milk protein yield by the dairy cow.

EXAMPLE 2

Influence of Fat and Sulfur Levels on Site of Extruded SBM Digestion for Animal Nugget Samples Prepared Using an Anderson Extruder Briefly, all but one of the samples of animal feed nuggets, were prepared using an Anderson Cooking Extruder. The Anderson Cooking Extruder is a production scale extruder with a 150 horsepower motor and the capacity to produce 3500 lbs/hr of animal feed. The animal feed nugget samples were then evaluated in sacco and in vitro using a fistulated Holstein cow in order to determine the digestibility of the samples.

Sample Preparation

Seven 2,000 pound animal feed samples (C2 and H–M) were prepared consistent with the proportions of Table 5 below:

TABLE 5

Composition of Animal Feed Samples (I–O)

| Sample/Component | C2 | H | I | J | K | L | M |
|---|---|---|---|---|---|---|---|
| SBM (%) | 100 | 100 | 99.98 | 97 | 94 | 93.98 | 96.98 |
| Fat (%) | 0 | 0 | 0 | 3 | 6 | 6 | 3 |
| Sulfur (%) | 0 | 0 | 0.02 | 0 | 0 | 0.02 | 0.02 |

Sample C2 is a control comprising untreated (i.e. unextruded) SBM. Samples H–M comprise various embodiments of the present invention.

The extruded animal feed nugget samples (H–M) were prepared using an Anderson Cooking Extruder. Specifically, the SBM is ground through a No. 4 Hammermill screen and an ACM air classifying grinder with the separator operating at 300 rpm. The ground SBM and sulfur (sulfur flour) were placed in proportions consistent with Table 5 in a dry mixer (i.e. 5 ton ribbon mixer) and blended until a homogenous mixture for each sample was obtained. This mixture along with the added fat (beef tallow) was fed to a 150 horsepower, 8" Anderson Cooking Extruder equipped with a 0.16 inch die (17 holes). The extruder was run at the conditions detailed in Table 6:

TABLE 6

Extrusion Conditions Using an Anderson Cooking Extruder

| Sample/Conditions | H | I | J | K | L | M |
|---|---|---|---|---|---|---|
| Number of knife blades | 8 | 8 | 8 | 8 | 8 | 8 |
| Extruder amps | 155 | 160 | 128 | 109 | 109 | 144 |
| Conditioned meal temp F. | 222 | 226 | 220 | 220 | 222 | 227 |
| Water, conditioner gpm | 2.2 | 2.2 | 2.8 | 2.9 | 2.2 | 1.8 |
| Production rate dry meal lbs/min | 45 | 45 | 55 | 55 | 55 | 55 |

Each mixture was mechanically worked within the extruder at a temperature in excess of 100 C. with the pressures varying generally above 20 psig. The homogenous mixture was continuously passed through the extruder and finally through the extruder die. Each mixture was extruded through the die in continuous streams and was a coherent structure which expanded with passage through the die to form a striated structure. The product was sliced into nuggets with a diameter of approximately ¼" as it exited the die. The nuggets of each sample were then transferred by conveyor belt to a fluid bed dryer and dried at a temperature of 380 to 400 F.

The nuggets entered the dryer with a water content of about 30 wt % and after approximately 2.0 minutes in the dryer at the above-stated conditions, left the dryer with a water content of about 9.0 wt %. The finished nuggets exhibited a hard surface with good particle integrity.

In Sacco and In Vitro Evaluations

The unextruded and extruded Samples (C2 and H–M) were evaluated in sacco and in vitro as described in Example 1. The results of these tests are reported in percentage of dry matter disappearance and appear in Table 7:

TABLE 7

Dry Matter Disappearance (%)

| Sample/Treatment | C2 | H | I | J | K | L | M |
|---|---|---|---|---|---|---|---|
| 0 hr | 27.3 | 31.1 | 32.4 | 34.6 | 38.8 | 36.8 | 36.4 |
| In sacco 24 hr | 97.0 | 84.0 | 79.0 | 91.6 | 91.0 | 84.0 | 74.8 |
| In vitro (acid/pepsin) 1 hr | 97.5 | 96.0 | 98.6 | 97.5 | 98.2 | 99.5 | 99.3 |
| Escape (%) | 0.5 | 12.5 | 19.9 | 6.0 | 7.3 | 15.6 | 24.7 |

These results indicate that ruminal DM escape was maximized when SBM was extruded in the presence of 3.0% fat and 0.02% sulfur (Sample M). Under these extrusion conditions (i.e. an Anderson Cooking Extruder), the ruminal escape was influenced by both fat and sulfur levels. These results also indicate that inclusion of the rumen protected protein (i.e., samples H–M) into a reduced crude protein diet would maintain absorbable protein flow into the small intestine, preventing loss in milk and milk protein yield by the dairy cow.

EXAMPLE 3

Influence of Extrusion on Ruminal Escape of Crude Protein, Lysine and Methionine when Evaluated In sacco One 5 ton sample of hard, stable animal feed nuggets was prepared comprising 96.8% SBM, 3.0% fat (beef tallow) and 0.2% sulfur. The sample was extruded using the Anderson cooking extruder as described in Example 2. A control sample also was prepared comprising untreated (i.e. unextruded) SBM.

These two samples were evaluated in sacco as described in Example 1. These in sacco samples were further analyzed for quantities of residual crude protein, residual lysine and residual methionine using an Amino Acid Analyzer.

In an amino acid analysis, a portion of sample is mixed with hydrochloric acid solution in a modified Kjeldahl flask. To prevent oxidation of the amino acids, as much oxygen as possible is removed from the flask by repeated heating and freezing, under vacuum. The neck of the flask is heat sealed, and the flask heated in a 110 C. oven for 20 hours. Protein in the sample is hydrolyzed to amino acids by the hot hydrochloric acid solution. The samples are cooled, opened, mixed with internal standard and adjusted to pH 2.2.

The amino acids are separated on an ion exchange column, in an amino acid analyzer, by a pH gradient elution with controlled column temperatures. The separated amino acids are subsequently reacted with ninhydrin, forming color complex solutions that are measured spectrophotometrically. The concentration of each amino acid is quantitated against a standard solution of amino acids of known concentration, and internal standard, which is injected into the amino acid analyzer. (Using a 250 mg sample, the lowest confidence level of this method, for each amino acid, is 0.05 g/100 g sample.) The Residue (% of Initial DM) indicates the amount of either crude protein, lysine or methionine that was delivered to the abomasum. These values were calculated using the following formula:

$$[1-(\% \text{ DMD}/100)] \times [\text{Residue (\% of Residual DM)}/100]$$

The results of this test are reported in Table 8:

TABLE 8

Amount Crude Protein, Lysine and Methionine Remaining After SBM Digestion In Sacco (%)

|  |  | DMD (%) | Residue, (% of Residual DM) | | | Residue, (% of Initial DM) | | |
|---|---|---|---|---|---|---|---|---|
|  |  |  | CP | lys | met | CP | lys | met |
| Untreated SBM, | Undig. | 0 | 53.5 | 3.47 | 0.75 | 53.5 | 3.47 | 0.72 |
|  | 0 hr | 28.9 | 66.5 | 4.32 | 0.92 | 47.3 | 3.07 | 0.65 |
|  | In sacco 24 hr | 97.5 | 83.1 | 5.17 | 1.23 | 2.1 | .13 | 0.03 |
| Extruded SBM | Undig. | 0 | 53.5 | 3.47 | 0.72 | 53.5 | 3.47 | 0.72 |
|  | 0 hr | 32.1 | 72.4 | 4.49 | 0.97 | 49.2 | 3.05 | 0.66 |
|  | In sacco 24 hr | 62.5 | 83.1 | 5.17 | 1.23 | 31.2 | 1.94 | 0.46 |

These results compare the quantities of residual crude protein (CP), residual lysine (lys) and residual methionine (met) remaining after the digestion of untreated SBM and extruded SBM in sacco. Specifically, the extruded SBM of this invention showed 14.9 times more CP, 14.9 times more lys and 15.3 time more met remaining than for untreated SBM. This demonstrates the ability of the extruded SBM of this invention to deliver more protein and amino acids post-ruminally compared to untreated SBM.

EXAMPLE 4
Influence of Crude Protein Level and SBM Extrusion on Site of Nitrogen Digestion in Steers Four intestinally fistulated steers were housed and fed a specific diet (Diets C3, C4, N or O) comprising a mixture of corn silage (30%), alfalfa hay (20%) and a Ration mix (50%) on a dry matter basis offered ad lib for an adjustment period of at least two weeks. Two of the steers were fed a diet containing an untreated (i.e. unextruded) soybean meal (Diets C3 and C4). One of these diets was formulated to contain a dietary crude protein level of 16% (Diet C3); the other was formulated to contain a dietary crude protein level of 18.5% (Diet C4). The other two steers were fed a diet containing ground, extruded animal feed nuggets extruded animal feed nuggets comprising 96.8% soybean meal, 3.0% added fat (beef tallow) and 0.2% sulfur (Diets N and O). One of these diets was formulated to contain a dietary crude protein level of 16% (Diet N); the other was formulated to contain a dietary crude protein level of 18.5% (Diet O).

After completion of the adjustment period, five different types of samples were collected from the steers for a 5 day period. These samples included: rumen sampling, bacteria harvesting, duodenal sampling, ileal sampling and fecal sampling. From these samples tests were run and calculations were made to determine the dry matter intake, nitrogen intake, nitrogen in the duodenum and the nitrogen digestion in the small intestine.

The results of these tests are reported in Table 9:

TABLE 9

Influence of Crude Protein Level and SBM Extrusion on Site of Nitrogen Digestion in Steers

| Diet | C3 | C4 | N | O |
|---|---|---|---|---|
| Dietary Protein (%) and SBM type in Diet | 16 and unextruded | 18.5 and unextruded | 16 and extruded | 18.5 and extruded |
| Resulting Crude Protein (%) | 19 | 21 | 19 | 20 |
| Dry Matter Intake (kg/day) | 9.22 | 9.50 | 8.84 | 9.39 |
| Nitrogen Intake (g/day) | 282[a] | 319[c] | 268[a] | 299[b] |
| Nitrogen in Duodenum (g/day) | 222[a] | 235[ab] | 232[a] | 268[b] |
| Nitrogen Digestion in Small Intestine (% of duodenal entry) | 56.0 | 58.7 | 60.8 | 59.2 |

[a, b, c]means in the same row not followed by a common letter differ (P < .05) using LSD procedure.

These results demonstrate that the extruded SBM delivers more protein nitrogen to the small intestine in a digestible form. Specifically, the nitrogen intake was greater with the two higher percent crude protein diets. In addition, the 19% crude protein diet containing extruded SBM (Diet N) supplied the same amount of total nitrogen to the duodenum compared to the 21% crude protein diet containing regular SBM (Diet C4). Moreover, the 20% crude protein diet containing extruded SBM (Diet O) supplied greater total nitrogen to the duodenum as the 21% crude protein diet containing regular SBM (Diet C4). Finally, the digestibility of nitrogen in the small intestine was similar for diets containing either regular SBM or extruded SBM, demonstrating that extrusion does not decrease or increase digestibility of protein in the small intestine.

It also is interesting to note that the resulting dietary crude protein levels were higher than formulated. This increase in crude protein levels was due to an unexpectedly high crude protein level in the alfalfa hay portion of the diet.

EXAMPLE 5
Influence of Crude Protein Level and SBM Extrusion on Nitrogen Digestion in Mid-Lactation Cows Twelve Holstein cows in mid-lactation were housed and fed a diet comprising a mixture of corn silage (30%), alfalfa hay (20%) and a specific ration mix (50%) on a dry matter basis offered ad lib for an adjustment period of two weeks. One of these diets was comprised of an unextruded soybean meal and had a dietary crude protein level of 18.5%. The other diet was comprised of an extruded soybean meal having a dietary crude protein level of 16%.

After completion of the adjustment period, three different types of samples were collected for a five day period. These samples included: fecal and urine sampling and milk production. From these samples, tests were run and calculations were made to determine dry matter intake, nitrogen intake, nitrogen digestion, and milk production.

The results from these tests are reported in Table 10:

TABLE 19

Influence of Protein Source and Dietary Crude Protein Level in Digestibility and Nitrogen Excretion in Mid-Lactation Cows

| Diet | C5 | P |
|---|---|---|
| Dietary Protein (%) and SBM type in diet | 18.5 and unextruded | 16 and extruded |
| Dry Matter Intake (lb/day) | 44.7[a] | 44.3[a] |
| Milk (lb/day) | 70.3[a] | 69.4[a] |
| Nitrogen Intake (g/day) | 626[b] | 533[a] |
| Nitrogen Digested (% of intake) | 74.8[b] | 70.6[a] |
| Milk Nitrogen (g/day) | 167[a] | 173[a] |
| Milk Nitrogen (% of intake) | 26.7[a] | 32.6[b] |
| Urinary Nitrogen (g/day) | 246[b] | 174[a] |
| Urinary Nitrogen (% of intake) | 39.3[b] | 32.7[a] |

[a, b] means in the same row not followed by a common letter differ (P < .05) using LSD procedure.

These results demonstrate that the extruded SBM in combination with a lower crude protein diet (Diet P) maintained milk and milk protein yield, increased efficiency of milk protein nitrogen output and significantly reduced waste urinary nitrogen output as compared to the unextruded soybean diet (Diet C5).

EXAMPLE 6

Influence of pH on Site of Extruded SBM Digestion When Evaluated In Sacco and In Vitro Five 150 pound samples of hard, stable animal feed nuggets (Q–U) were prepared consistent with the proportions in Table 11:

TABLE 11

Composition of Animal Feed Samples

| Sample/Component | Q | R | S | T | U |
|---|---|---|---|---|---|
| SBM (%) | 96.8 | 96.8 | 96.8 | 96.8 | 96.8 |
| Fat (%) | 3.0 | 3.0 | 3.0 | 3.0 | 3.0 |
| Sulfur (%) | 0.2 | 0.2 | 0.2 | 0.2 | 0.2 |
| pH | 6.6 | 6.0 | 5.5 | 7.0 | 7.5 |

Phosphoric acid (75%) and/or sodium hydroxide (50%) was added in an amount sufficient to alter the pH of the various samples.

These animal feed nugget samples were extruded using the Wenger Cooking Extruder as described in Example 1. These samples were then evaluated in sacco and in vitro by the process also described in Example 1.

The results of these tests are reported in percentage of dry matter disappearance in Table 12:

TABLE 12

Dry Matter Disappearance (%)

| Sample/Treatment | | Q | R | S | T | U |
|---|---|---|---|---|---|---|
| pH | | 6.6 | 6.0 | 5.5 | 7.0 | 7.5 |
| In sacco | 0 hr | 30.5 | 31.8 | 32.7 | 30.8 | 31.1 |
| | 24 hr | 66.2 | 64.6 | 63.6 | 69.2 | 75.6 |
| In vitro (acid/pepsin) | 1 hr | 97.4 | 97.5 | 96.8 | 97.6 | 97.6 |
| Escape (%) | | 32.0 | 33.7 | 34.3 | 29.1 | 22.5 |

These results indicate that increasing meal pH decreased the percentage of ruminal dry matter escape when SBM was extruded in the presence of 0.2% sulfur and 3.0% fat. However, extruded SBM receiving no pH modification (i.e., Sample Q) showed a similar percentage of ruminal dry matter escape as the lower pH modified extruded SBM (i.e. Samples R and S).

EXAMPLE 7

Influence of Abomasal Casein or Isolated Soy Protein Infusions on Milk Yield and Composition and Nitrogen Balance in Cows Fed Protein Limiting Diets Twelve lactating Holstein cows (4 with ruminal cannulas, 4 with abomasal catheters and 4 "intact", i.e. without cannulas or catheters) were group-housed and group-fed forage as a mixture of corn silage (25%), alfalfa hay (25%) and a concentrate mix (50%) on a dry matter basis offered ad lib for a two week period. The four intact cows were in a similar stage of lactation as the other eight cows.

At the end of the two week period, the 12 cows were divided into three groups. The four intact cows comprised one control group. The other groups were comprised of two abomasally and two ruminally cannulated cows each.

The three groups of cows then were fed a mixture comprising an adequate protein ration (50%), corn silage (25%) and alfalfa hay (25%) on a dry matter basis offered at an ad lib intake level for a two week period. The mixture was a soy hull and corn based milking ration which, when mixed with corn silage and alfalfa hay, provided on a DM basis: 18% Crude Protein (CP), 19.5% Crude Fiber (CF), 1.2% Calcium, 0.44% Phosphorous and 73% Total Digestible Nutrients (TDN).

At the end of the two week period, the cows then were fed for a three week period a mixture comprising an inadequate protein ration (50%), corn silage (25%) and alfalfa hay (25%) on a dry matter basis offered at an ad lib intake level. The mixture was a soy hull and corn based milking ration which, when mixed with corn silage and alfalfa hay, provided on a DM basis: 12.4% Crude Protein (CP), 22% Crude Fiber (CF), 1.2% Calcium, 0.44% Phosphorous and 73% Total Digestible Nutrients (TDN). During this three week period, one of the groups of cannulated cows received an abomasal casein infusion (1100 g/day), while the other group of cannulated cows received an abomasal isolated soy protein infusion (1100 g/day) which was fortified with an amount of lysine and methionine to be equivalent to the casein infusion. The control group which consisted of intact cows only, received no protein infusion during this period. At the end of the three week period, the cows again were fed the mixture containing the adequate protein ration for a final two week period.

A positive displacement pump delivered the protein infusions to the two groups of cannulated cows. The infusions were delivered at a rate of 1100 g/22 hours. Milk samples were collected the last 5 days of each infusion period. Dry matter intake was fixed at prevailing levels 3 days prior to and during the collection period. Milk/day lb, protein (%) and protein (lb/day) were measured.

The results of these tests are reported in Table 13:

TABLE 13

Influence of Casein or Isolated Soy Protein on Milk and Milk Protein Yield In Cows Fed A Low Protein Diet

| Period Infusion | Pre-Infusion | No Infusion | Casein Infusion | Isolated Soy Protein Infusion | Standard Error |
|---|---|---|---|---|---|
| Milk/Day LB | 84.45b | 77.20a | 80.82ab | 80.10ab | 2.02 |
| Protein(%) | 2.950a | 2.987a | 3.197c | 3.115b | 0.013 |
| Protein (LB/day) | 2.478b | 2.283a | 2.595b | 2.494b | 0.057 | a,b,c means in the same row not followed by a common letter differ (P < 0.05) using the LSD procedure.

These results indicate that the cows fed with a lower crude protein diet, but infused with isolated soy protein were capable of producing milk and milk protein at levels similar to those achieved on an adequate protein diet. In comparison, the cows fed with a lower crude protein diet which received no infusion produced milk and milk protein at lower levels than those achieved with an adequate protein diet.

EXAMPLE 8
Influence of Protein Source and Dietary Protein Level on Milk Component Yield and Efficiency in Early Lactation Twenty-four Holstein cows in early lactation were housed and fed a diet comprising a mixture of corn silage (30%), alfalfa hay (20%) and a specific Ration (50%) on a dry matter basis offered ad lib for a period of 15 weeks following calving. Twelve of the cows were fed a diet comprised of an unextruded soybean meal which contained a dietary crude protein level of 18.5%. The other twelve cows were fed a diet comprised of an extruded soybean product which contained a dietary crude protein level of 16%.

Covariant adjustments were performed at both ends of the study; consequently, production responses are averages from weeks 3 to 12 of lactation. Theses results are reported in Table 14:

TABLE 14

Influence of Protein Source and Dietary Crude Protein Level on Milk Component Yield in Early Lactation

| Diet | C6 | V |
|---|---|---|
| Dietary Protein (%) and SBM type in diet | 18.5 unextruded SBM | 16 extruded SBM |
| Dry Matter Intake (lb/day) | 42.1 | 43.7 |
| Milk Yield (lb/day) | 87.5 | 90.8 |
| Fat (lb/day) | 2.25 | 2.33 |
| Protein (lb/day) | 2.59 | 2.65 |
| Milk Composition | | |
| Fat (%) | 2.57 | 2.57 |
| Protein (%) | 2.96 | 2.92 |
| Milk Crude Protein/Feed Crude Protein Intake | .33 | .38 |

These results indicate that dietary protein can be reduced as much as 10% (Diet V) with no losses in milk and milk component yield in early lactation cows. These results further indicate that efficiency of milk protein synthesis is concomitanty improved.

Although the invention has been described in considerable detail through the preceding specific embodiments, this detail is for purposes of illustration. Many variations and modification can be made by one skilled in the art without departing from the spirit and scope of the invention.

What is claimed is:

1. A method of achieving a similar level of milk and milk component yield as ruminants fed a normal crude protein diet, the method comprising the feeding of an animal feed supplement comprising at least one rumen protected protein in combination with a lower crude protein diet to ruminants.

2. The method of claim 1 in which the rumen protected protein originates from at least one of the group consisting of soybean meal, cottonseed meal, corn gluten meal, palm oil meal, an animal by-product meal, a plant by-product meal and a microbial protein meal.

3. The method of claim 2 in which the rumen protected protein originates from soybean meal.

4. The method of claim 1 wherein the animal feed supplement is comprised of about 90 wt. % of a rumen protected protein.

5. The method of claim 4, wherein the rumen protected protein comprises about 96 wt %.

6. The method of claim 1 wherein the animal feed supplement is further comprised of between about 1.0 wt % and about 6.0 wt % added fat.

7. The method of claim 6 wherein the added fat is at least one fat selected from the group consisting of beef tallow, bleachable fancy tallow, choice white grease, yellow grease, soybean oil, palm oil, cottonseed oil and sunflower oil.

8. The method of claim 7 in which the added fat is beef tallow.

9. The method of claim 6, wherein the added fat comprises about 3.0 wt %.

10. The method of claim 1 wherein the animal feed supplement is further comprised of between about 0.02 wt % and 5.0 wt % of sulfur.

11. The method of claim 10 wherein the sulfur comprises about 0.2 wt %.

12. The method of claim 1 in which the lower crude protein diet comprises a quantity of protein that is reduced by at least 5% from the prevailing published National Research Council requirements for crude protein.

13. The method of claim 12 in which the lower crude protein diet comprises a quantity of protein that is reduced by at least about 10%.

14. The method of claim 13 in which the lower crude protein diet comprises a quantity of protein that is reduced by at least about 20%.

15. The method of claim 14 in which the lower crude protein diet comprises a quantity of protein that is reduced by at least about 30%.

16. The method of claim 15 in which the lower crude protein diet comprises a quantity of protein that is reduced by a maximum of about 50%.

* * * * *